United States Patent [19]
Foster

[11] Patent Number: 5,575,909
[45] Date of Patent: Nov. 19, 1996

[54] SEPARATORS

[76] Inventor: William W. Foster, 16 Gulf Road, Hillsborough, County Down, BT26 6ER, Great Britain

[21] Appl. No.: 211,826

[22] PCT Filed: Oct. 19, 1992

[86] PCT No.: PCT/GB92/01923

§ 371 Date: Jun. 17, 1994

§ 102(e) Date: Jun. 17, 1994

[87] PCT Pub. No.: WO93/07946

PCT Pub. Date: Apr. 29, 1993

[30] Foreign Application Priority Data

Oct. 18, 1991 [GB] United Kingdom .................. 9122178

[51] Int. Cl.$^6$ ................................................. B01D 21/26
[52] U.S. Cl. ....................... 210/304; 210/512.1; 210/521; 210/532.1; 210/533; 210/305
[58] Field of Search ................................ 210/512.1, 294, 210/787, 304, 307, 513, 519, 521, 525, 532.1, 533, 534, 537

[56] References Cited

U.S. PATENT DOCUMENTS 2,790,554  4/1957  Work ........................................ 210/294

FOREIGN PATENT DOCUMENTS

| 2282926 | 3/1976 | France . |
| 2536672 | 6/1984 | France . |
| 867541 | 7/1949 | Germany . |
| 1052951 | 3/1959 | Germany . |
| 2146922 | 5/1985 | United Kingdom . |

OTHER PUBLICATIONS

Translation of German Referance No. 1052951.

*Primary Examiner*—David A. Reifsnyder
*Attorney, Agent, or Firm*—Edwin E. Greigg; Ronald E. Greigg

[57] ABSTRACT

A separator including an assembly of a first vessel and an upwardly elongate unit including a helical baffle forming a spiral passage in the unit. The first vessel includes a sump. An inlet is provided to convey a mixture to be separated into the assembly and at least two outlets are provided through which the separated components are removed from the assembly.

17 Claims, 6 Drawing Sheets

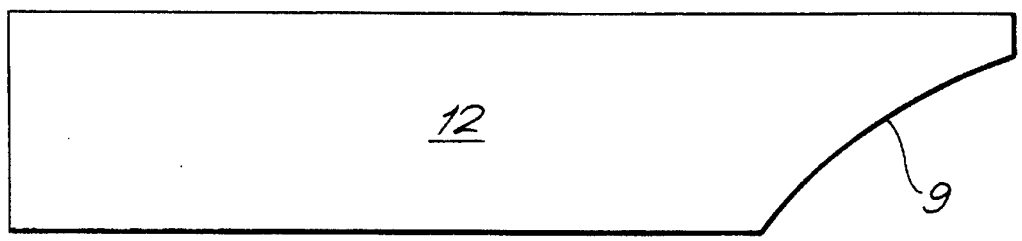
FIG. 11.
FIG. 12.
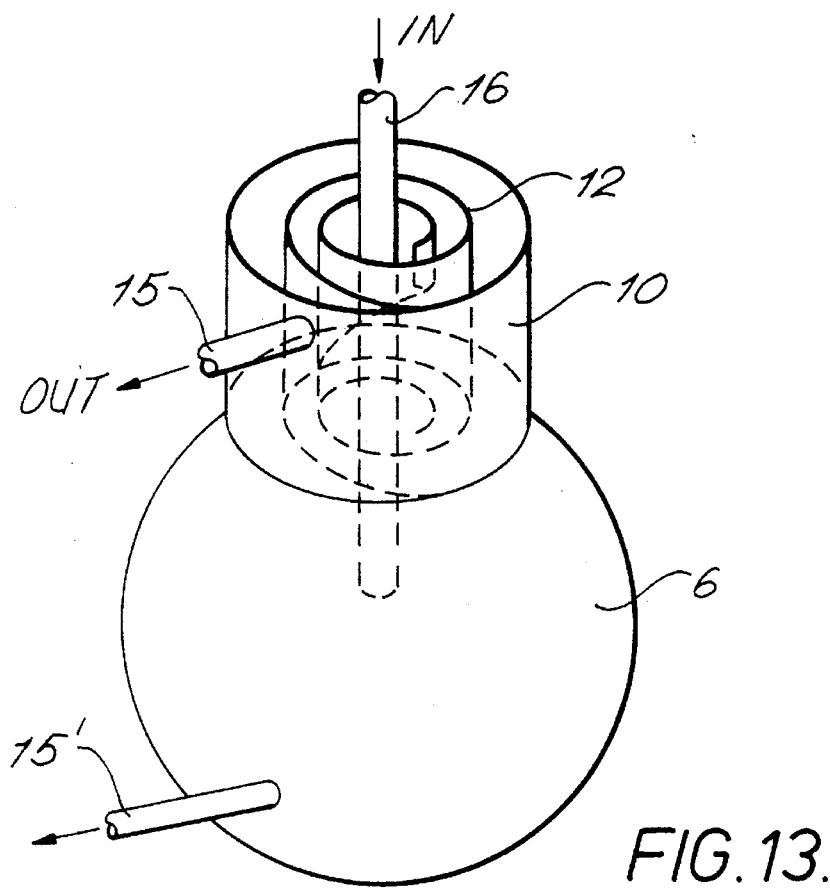
FIG. 13.

SEPARATORS

This invention relates to separators for separation of liquids from mixtures of liquids having different specific gravities, or for separation of liquids and solids from mixtures of liquids and solids. The technology of separation is complex and involves factors which affect the efficiency of separation including differences in specific gravity (density for short), surface chemistry, flow characteristics, temperature, time and design of the containing vessels.

In practice, layers of material in a vessel will tend over a time period to stratify according to density, the most dense lying at the bottom and the least dense at the top. The smaller the differences in density, the longer it will take for efficient separation to occur.

Separators are designed in such a way as to:

a) provide time for settling to occur;
b) avoid excessive intermixing between different layers especially during the entry and exiting of materials; and
c) facilitate the easy removal of separated materials.

Traditional separators such as those used in industry tend to be bulky in order to allow time for settling to occur. Many contain a series of chambers to quieten flow and to achieve a degree of separation before passing material on to subsequent stages.

Problems often occur due to carry-over of unwanted materials. For instance, solid debris tends to be present at the outflow from septic tanks, leading to excessively high biological oxygen demand in the effluent and to eventual clogging of drainage channels.

Separators, called interceptors, which are used to separate petrol and oil from surface water drainage installations on garage forecourts can also become inefficient due to intermixing at high flow-rates, such as may occur in flash floods. This can result in excessive carry-over of unwanted materials into a mains drainage system.

In addition to the above operational problems, conventional separators are often expensive in the use of materials of construction and labour in manufacture and installation, and take up a good deal of space in manufacture, transport and use. A large number of septic tanks are still constructed in situ using blocks and mortar.

An object of the present invention is to obviate or mitigate these manufacturing and operational problems.

Accordingly, the present invention is a separator comprising an assembly of a first vessel and an upwardly-oriented elongate unit including a helical baffle forming a spiral passage in said unit, the first vessel having a sump and the unit being in fluid communication with the first vessel, an inlet means being provided to convey a mixture to be separated into the assembly, and at least two outlet means being provided through which the separated components of the mixture are removable from the assembly, the mixture passing through the first vessel and the passage of the unit with a disposable component being discharged and a required residual component being held in the first vessel.

Preferably, the unit comprises the baffle and is mounted inside the first vessel with the sump of the first vessel formed in the central portion thereof, the inner part of the baffle being cut-away adjacent to a bottom plate of the first vessel.

First alternatively, the unit is a second vessel of smaller dimensions than the first vessel with the baffle therein and is provided upwardly-oriented in the first vessel and extending a predetermined distance thereinto with therebelow a lower part of the first vessel serving as a sump to hold the residual component. The unit is preferably arranged to receive the mixture at the inlet end of the passage substantially centrally of the unit to flow around the passage with the disposable component being discharged therefrom at therefrom at or adjacent to the end of the passage via a pipe through the first vessel, while the residual component flows into the sump of the first vessel. Alternatively, the unit may be arranged to receive a partially separated mixture, the mixture first having passed through the first vessel to perform an initial separation of the components, the disposable component of the mixture thereafter being discharged from the unit via piping through the first vessel.

Further alternatively, the unit is preferably a second vessel with the baffle mounted therein, the unit being mounted above the first vessel, the inlet means passing through the unit to terminate below a bottom plate in the unit, an aperture being provided in said bottom plate at or adjacent to an inner end of the passage to allow flow from the first vessel into the inner end of the passage to be discharged adjacent to the top of the unit at or adjacent to the outer end of the passage.

Preferably also, the spiral passage has at least two concentric circling coils. An outer coil of the bottom end of the baffle is preferably apertured to allow flow between the part of the passage in the outer coil and the part of the passage in the next adjacent coil.

Preferably further, the baffle is formed from coiled straight sheet. Alternatively, the baffle is formed from coiled corrugated sheet.

Embodiments of the present invention will now be described, by way of example, with reference to the accompanying diagrammatic drawings, in which:

FIG. 11 is a rectangular shape which illustrates the outer surface of the vessel when not forming a cylinder;

FIG. 12 illustrates the shape of the inner unit when extended in a line before forming a spiral within the vessel; and FIG. 13 is a perspective view of a modification in which a second vessel is mounted on a first vessel with an axial inlet.

Figure 1:
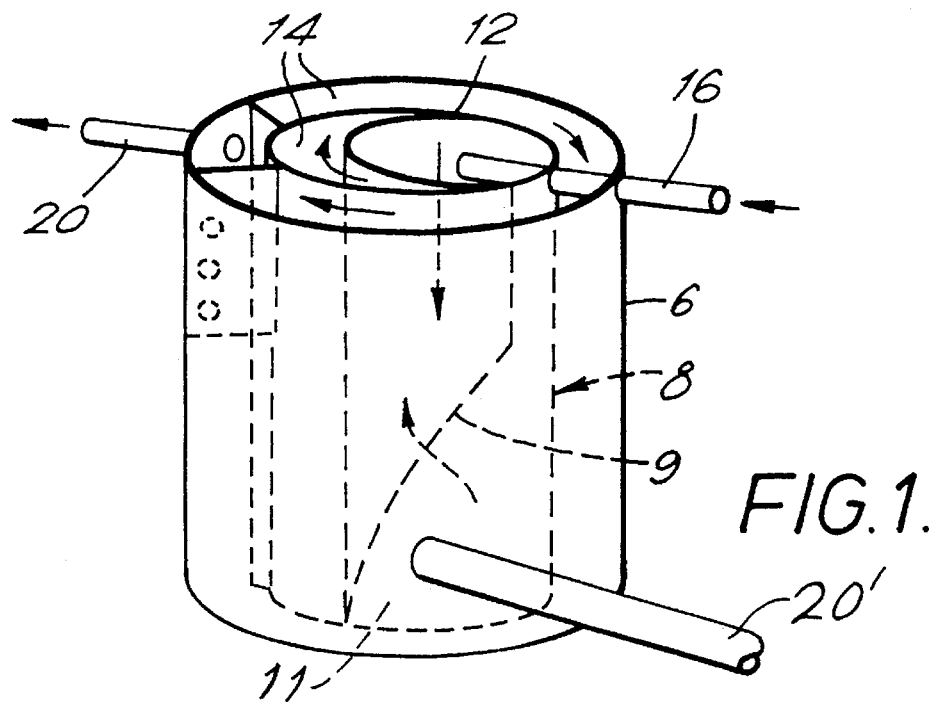
FIG. 1 is a perspective view of a separator according to a first embodiment of the present invention.

Referring to the drawings, a separator comprises an assembly of a first vessel 6 and a unit 8 having an internal helical baffle 12 forming a spiral passage 14 extending the full height of the vessel 10. The spiral passage 14 has at least two concentric circling coils. Inlet means is provided to convey a mixture to be separated into the assembly and a first outlet means and at least one second outlet means 20, 20' are provided through which the separated components of the mixture are removable from the assembly.

In a first embodiment as shown in FIG. 1, the unit 8 comprises baffle 12 inside the first vessel 6 which is shown rolled into a straight line in FIG. 11. The passage 14 has two circling coils with an inlet pipe 16, forming the inlet means, terminating to allow discharge to enter the first vessel 6 axially to pass into a sump 11 of the first vessel 6. The sump 11 is formed in the central position of the first vessel 6 with the lower part of the inner end of the baffle 12 being cut-away on a slope at 9 adjacent to a bottom plate of the first vessel 6. The slope 9 is shown in FIG. 12 which shows the baffle 12 rolled out in a straight line.

In use, the assembly is installed underground and is integrated into the system through which a mixture of water and solids, e.g. from a piped soil waste system, to be separated is fed through inlet pipe 16, ie. the inlet means. The bulk of the high density component i.e. solid wastes, remains in the sump 11 with the remainder of the higher density component being deposited on the floor of the passage 14 as the mixture passes therethrough with the disposable component, i.e. water being discharged through an outlet 20. As the solid wastes, which are the required residual component dissolve, they are carried away in the water via outlet 20'.

In the remaining embodiments, the unit 8 comprises an upstanding elongate second vessel 10 of hollow cylindrical shape having a side surround 10A, a bottom 10B and a top (not shown). The second vessel 10 has an internal baffle 12 forming a spiral passage 14 extending the full height of the second vessel 10. The spiral passage 14 has at least two concentric coils.

Figure 2:
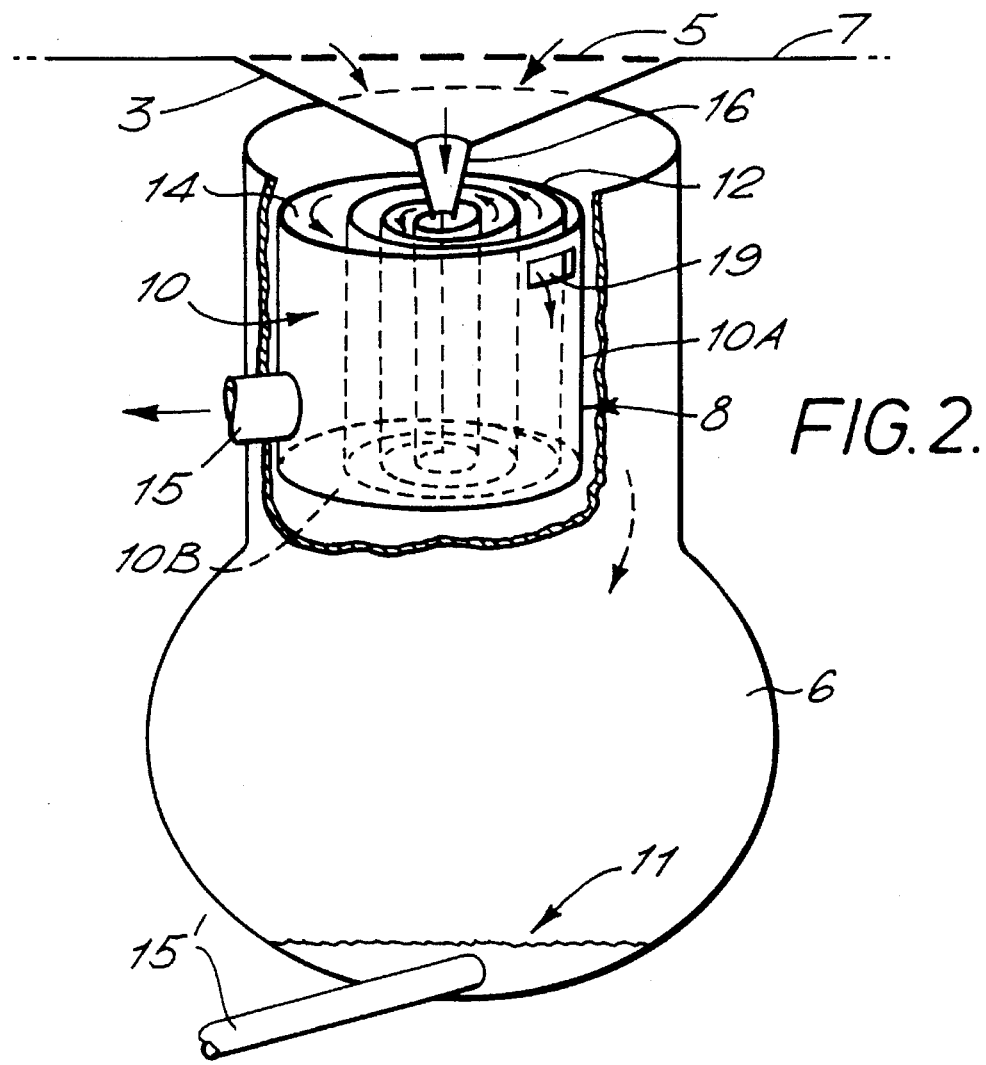
FIG. 2 is a perspective view of a unit of a separator according to a second embodiment with part cut-away for clarity.
Figure 3:
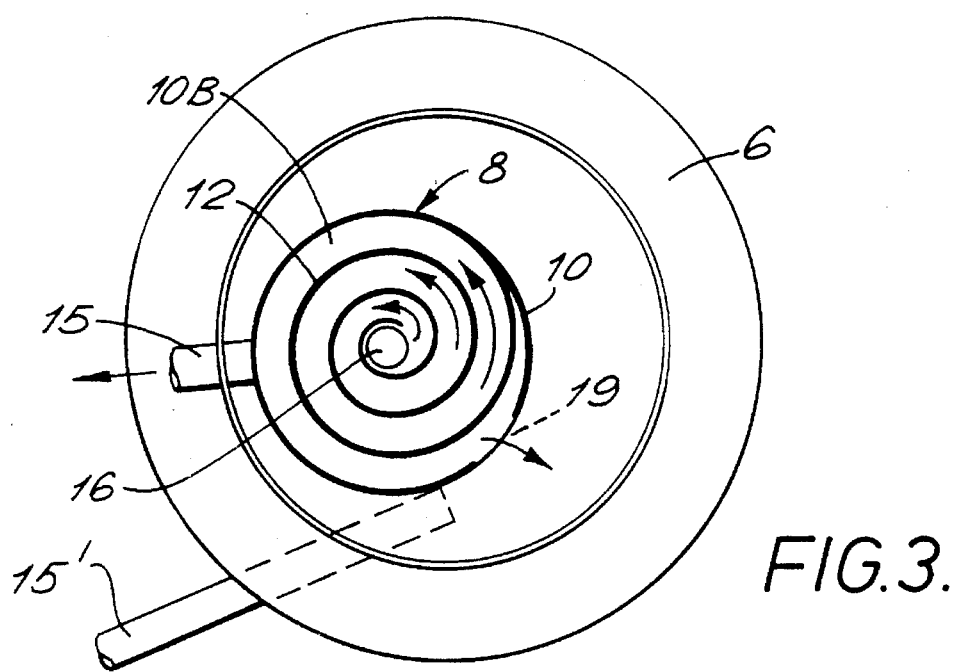
FIG. 3 is a plan view of the separator shown in FIG. 2.

In a second embodiment as shown in FIGS. 2 and 3 in which like parts are denoted by like numerals, the unit 8 is a second vessel 10 of smaller dimensions than the first vessel 6 with the baffle 12 therein and is provided upwardly-oriented in the first vessel 6. The second vessel 10 extends a predetermined distance thereinto with therebelow a lower part of the first vessel 6 serving as the sump 11 to hold the residual component. The unit 8 is arranged to receive the mixture at the inlet end of the passage 14 substantially centrally of the unit 8 to flow around the passage 14 with the disposable component being discharged therefrom at or adjacent to the end of the passage 14 via a pipe 15, ie. an outlet means, passing through the first vessel 6, while the residual component flows through aperture 19 provided in the wall 10A of the second vessel 10 into the sump 11 of the first vessel 6 via outlet 15'.

In use, the assembly is installed underground and integrated into the system from which a mixture of liquids is to be fed. This embodiment is particularly to be fitted under a garage forecourt near petrol pumps and is to recover petrol or oil from a mixture of same with rainwater or other liquid combined therewith, such as may occur with flash spills of petrol. The disposable component is the water and the required residual component is the petrol or oil which is removed periodically through a second outlet means, namely a trap (not shown) provided in a top of the first vessel 6. FIG. 2 shows a ground surface 7, a grating 5 and a funnel 3 which feeds into the inlet pipe 16.

Figure 4:
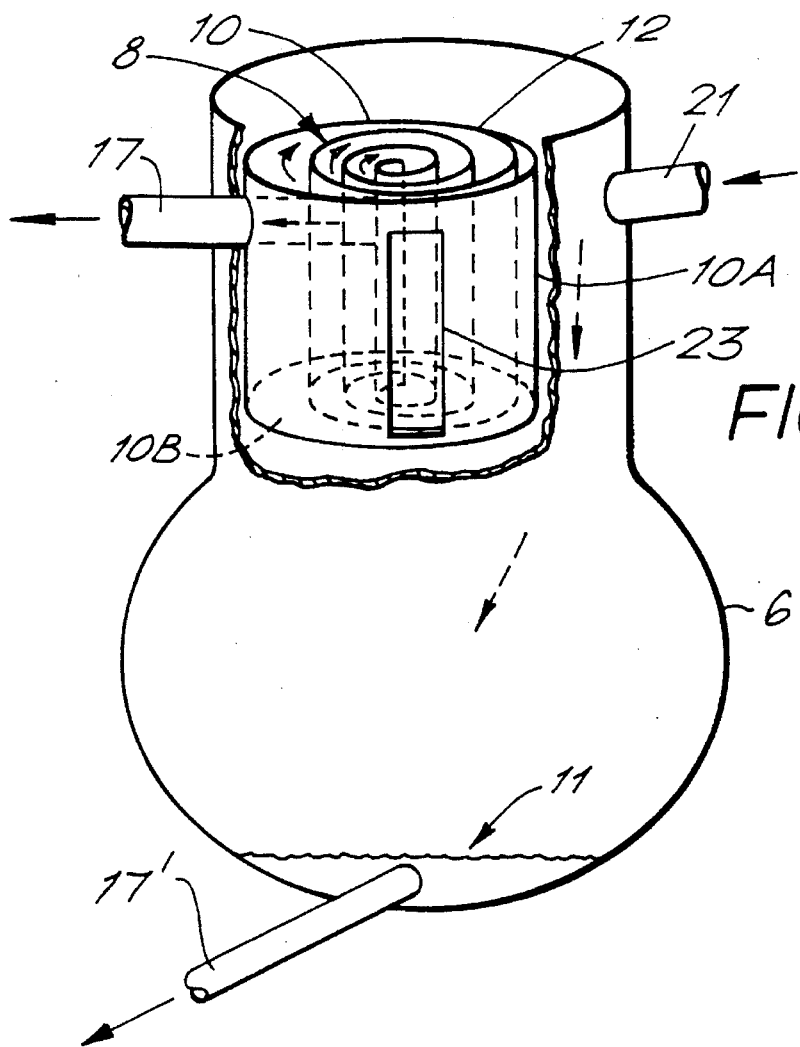
FIG. 4 is a perspective view of a separator according to a third embodiment with part cut-away for clarity.
Figure 5:
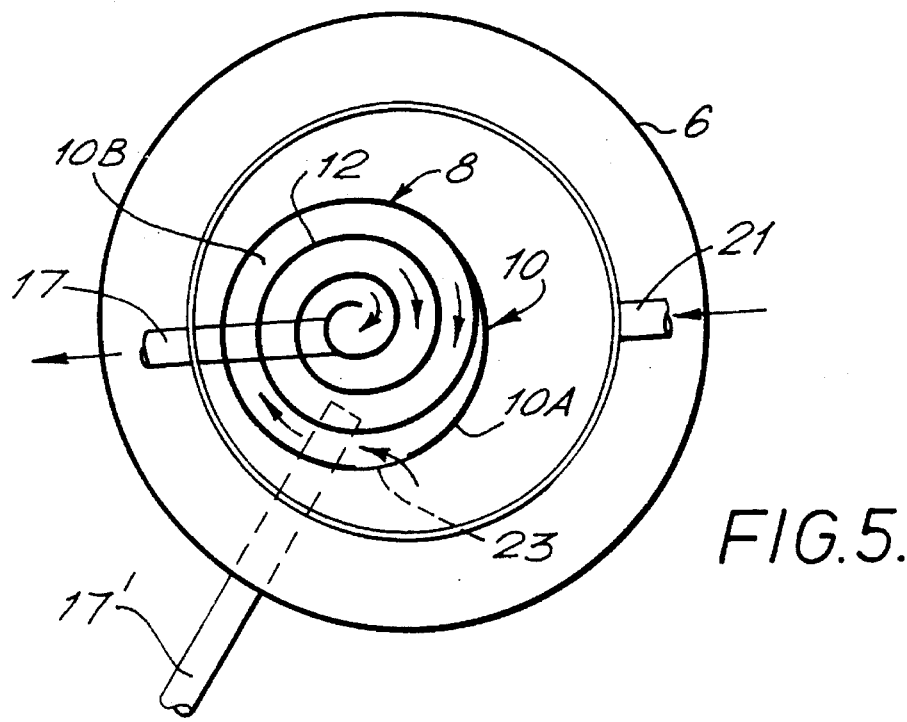
FIG. 5 is a plan view of the separator shown in FIG. 4.

In a third embodiment as shown in FIGS. 4 and 5 in which like parts are denoted by like numerals, the unit 8 is similarly provided in the first vessel 6 as in the second embodiment. The unit 8 is arranged to receive a partially separated mixture, the mixture first having passed through the first vessel 6 to perform an initial separation of the components. The disposable component of the mixture thereafter is discharged from the unit 8 via piping 17 through the coils in the baffle 12 and the first vessel 6. The inlet means is a pipe 21 feeding into the first vessel 6. An upright aperture 23 is provided in the wall 10A of the second vessel 10 through which the partially separated mixture passes into the passage 14 and has an outlet 17' at its bottom which connects with the sump 11.

In use, the assembly is installed underground and integrated into a soil waste disposal system and operates as above described.

Figure 6:
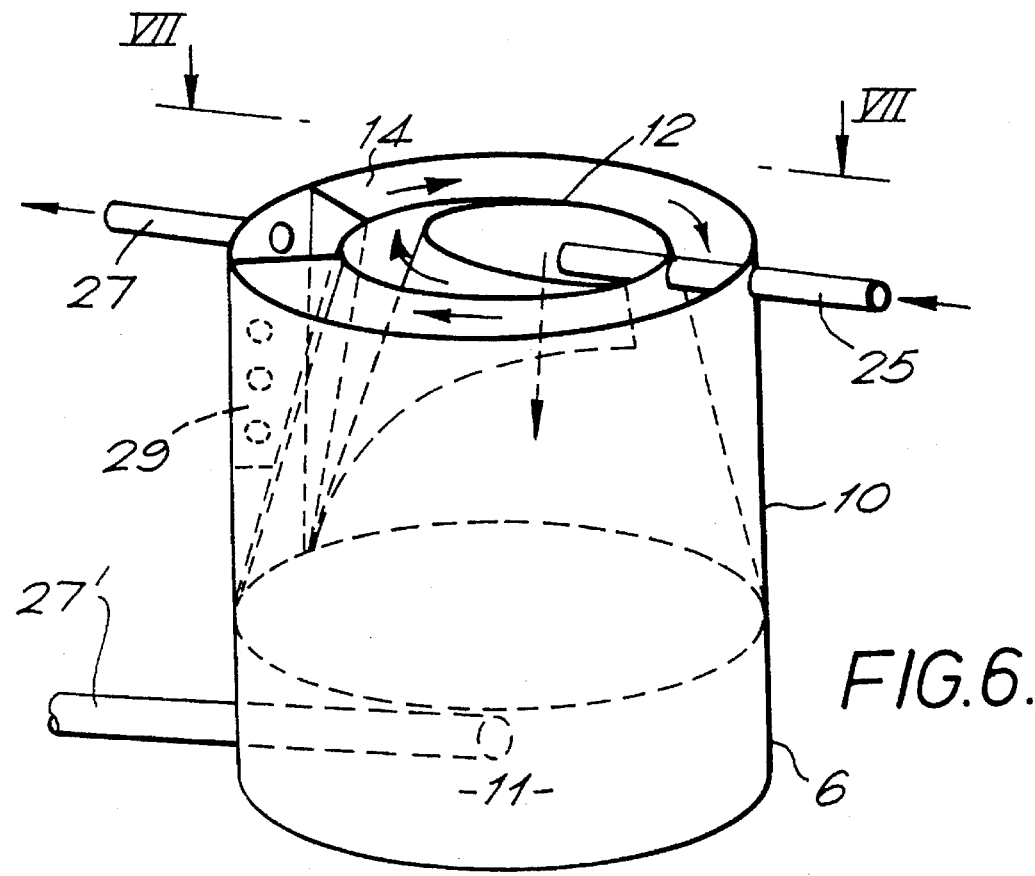
FIG. 6 is a perspective view of a separator according to a fourth embodiment.
Figure 7:
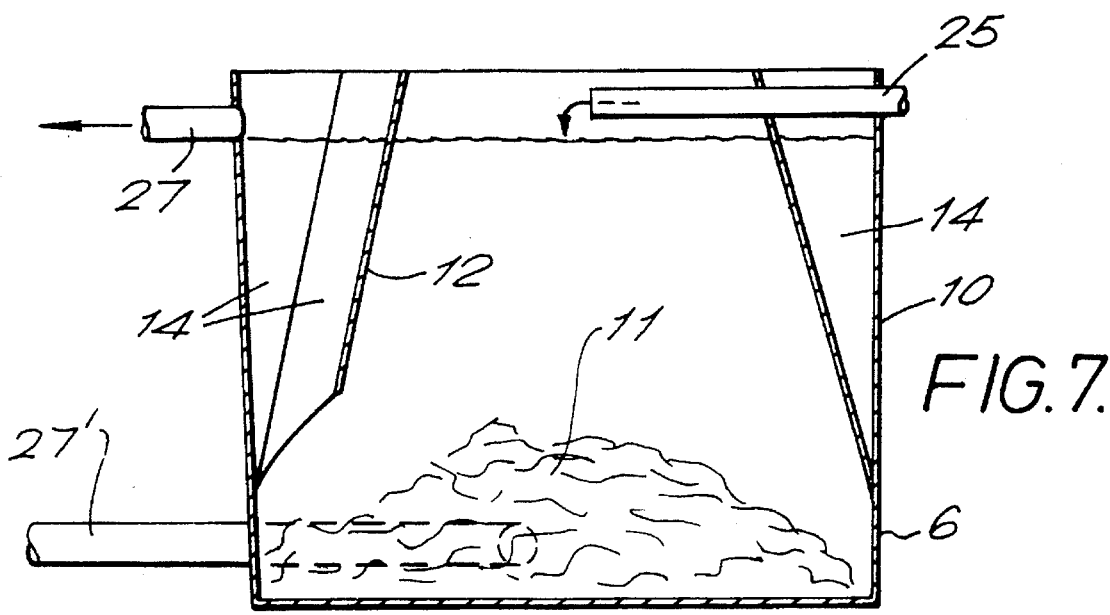
FIG. 7 is a cross-sectional view of the separator along line VII—VII of FIG. 6.

In a fourth embodiment as shown in FIGS. 6 and 7 in which like parts are denoted by like numerals, the assembly includes a unit 8 comprising a second vessel 10 with a baffle 12 mounted therein. The unit 8 is mounted above the first vessel 6 with the inlet means being a pipe 25 passing through the baffle 12 of the unit 8. The baffle 12 is of conical shape with its bottom edge secured to the wall 10A of the second vessel 10 as shown. The inner coil of the baffle 12 is cut-away as in the first embodiment. The outlet means is a pipe 27. A restriction plate 29 is provided across the passage 14 as shown, the plate 29 extending downwardly of the passage about two thirds of the distance and having a series of holes therein. The sump 11 has an outlet 27' connected therewith.

In use, the assembly is also installed underground and integrated into the system, ie. a soil waste system, and is used in the same manner as for the previous embodiments.

In a modification (not shown) of the fourth embodiment, the baffle 12 in the unit 8 is vertical and the pipe 25 extends through the baffle 12 and is cranked downwardly to terminate below a bottom plate in the unit 8, an aperture being provided in said bottom plate at or adjacent to an inner end of the passage 14 to allow flow from the first vessel 6 into the inner end of the passage 14 to be discharged adjacent to the top of the unit 8 at or adjacent to the outer end of the passage 14.

Figure 8:
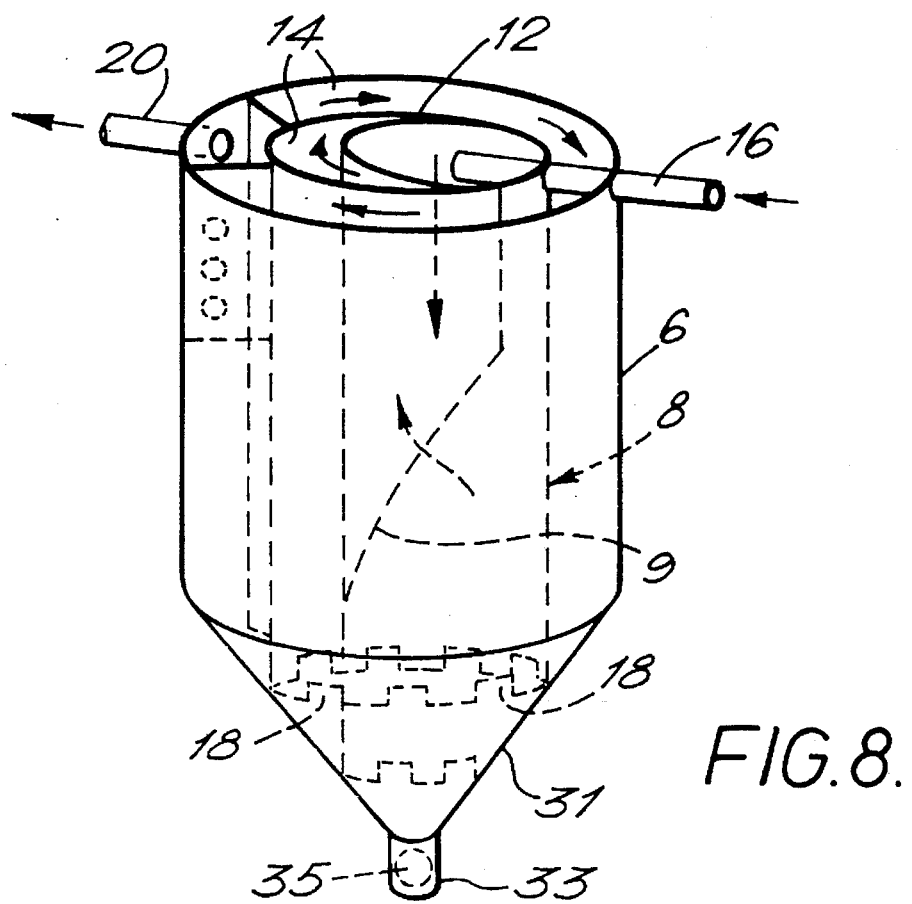
FIG. 8 is a perspective view of a modification of the separator shown in FIG. 1.

In a modification of the first embodiment as shown in FIG. 8 in which like parts are denoted by like numerals, the bottom of the first vessel 6 is shaped as a funnel 31, the outlet pipe 33 of which has a valve 35 through which the sump 11 can be drained, the outlet pipe 33 forming a second outlet means.

Figure 9:
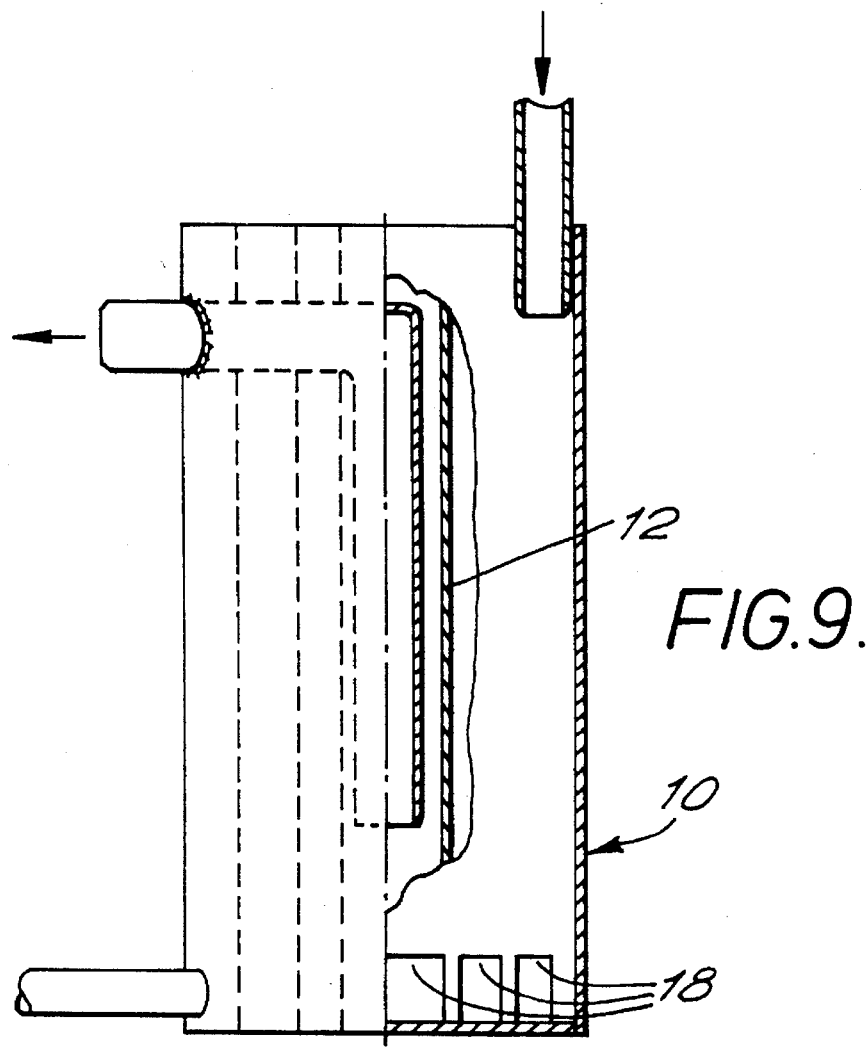
FIG. 9 is a vertical cross-sectional view of the separator shown in FIGS. 2, 3, 4 or 5 with a modified baffle.
Figure 10:
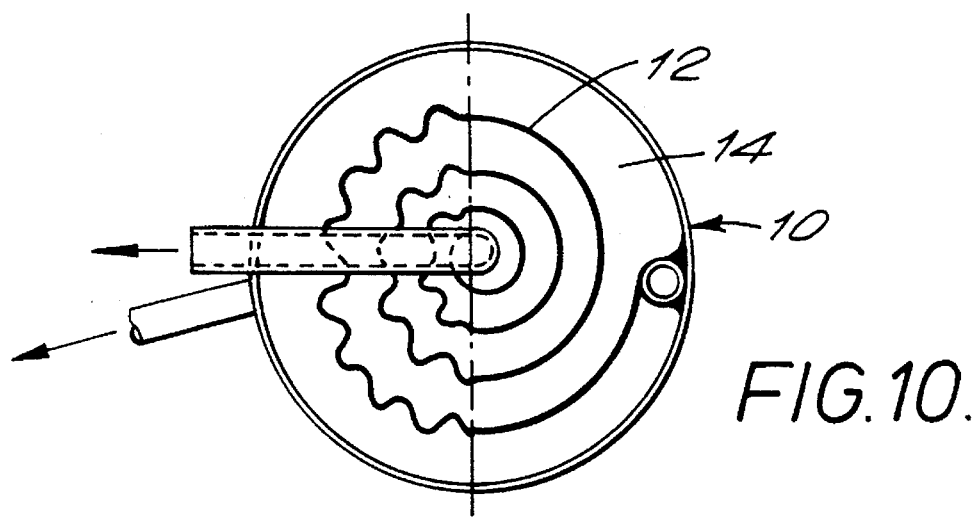
FIG. 10 is a plan view of a unit of a separator with part of the baffle shown as corrugated.

In common to all embodiments, an outer coil of the bottom end of the baffle 12 may be apertured at 18 to allow flow between the part of the passage 14 in the outer coil and the part of the passage 14 in the next adjacent coil. The apertures 18 are cut-outs extending upwardly from the bottom of the vessel 10 as shown in FIGS. 8 and 9.

In a modification, the aperture 19 in FIG. 2 may be in the form of a weir radially extending a short distance down from the top of the wall 12.

In a second modification, the baffle 12 may be of inverted frusto-conical shape.

The assembly may have flexible components provided in a collapsed state which are made rigid on erection such as for use in third world countries, or for emergency use.

Separators are designed to work continuously and/or intermittently. The structure of the present separators is to improve the efficiency of separation when used in either or both of these regimes.

When operating as a continuous flow separator, the structure maximises the period of time in which liquids and solids or a mixture of liquids of different density can separate and it minimises the effects of intermixing. This results in efficient separation and subsequent recovery from appropriate outlets.

When operating intermittently (such as in domestic septic tanks), the structure features an additional advantage in that it utilises the periods of time when flow has ceased for separation to continue. In these quiet periods, liquid throughout the separator can become very clear. Subsequent heavy flushes, such as might occur when discharging baths or lavatories, will stir up much of the debris which had settled nearest the entrance zone. However, as flow continues round the passage 14, channelling ceases and piston flow takes over. The liquid then being discharged is a clear liquor created during a long period of quiescence, this liquid persisting as long as the turbulent regions do not penetrate to the exit end of the passage 14.

By suitable design of volumes and flow rates, outflow liquids can be made to consist only of liquors which have had long settling periods. In this way, the different structures of the invention provides opportunity of extremely clear discharges into drainage and soakaway systems. Chemical characteristics of any dissolved material, as distinct from solids, are unlikely to be affected.

A separator as described above can be installed in a linked system having a pre-settling chamber to remove the bulk of low density and high density materials, so maximising the effectiveness of the coils of the passage of the separator.

The baffle as has been mentioned above can be either coiled from a straight or corrugated sheet. The straight sheet is used in cases where minimum turbulence is required, and a corrugated sheet is used to create controlled turbulence, so discouraging by-pass flow and/or assisting in the formation and ascent of low density globules, and/or the descent of high density materials.

The baffle may be of rigid or flexible material.

The second vessel 10 may be separate from the first vessel 6 but closely positioned thereto.

FIG. 13 illustrates a perspective view of a modification in which a second vessel 10 is positioned above the first vessel 6 and the inlet is along the axis and extends through the second vessel into the first vessel.

Variations and other modifications can be made without departing from the scope of the invention described above and as claimed hereinafter.

I claim:

1. A separator comprising an outer cylindrical first vessel and an elongate unit including a spiral baffle forming a spiral passage in said unit, the spiral baffle having at least two concentric coil portions which extend over a height of said first vessel with an innermost end of the baffle having a cut-away portion which extends from below an upper surface of said baffle on a slope away from the innermost end of said baffle toward a bottom surface of said baffle, the first vessel having a sump and the elongate unit being in fluid communication with the first vessel, an inlet means being provided to convey a mixture into the assembly to be separated, and a first outlet means and a second outlet means being provided through which the separated components of the mixture are separately removable from the assembly, the mixture passing through the first vessel and a spiral passage of the elongated unit with a disposable component of the mixture being discharged through the first outlet means and a residual component of the mixture being held in the first vessel from which it is periodically removed through the first or the second outlet means.

2. A separator according to claim 1, wherein the elongate unit comprises the baffle and is mounted inside the first vessel with the sump of the first vessel formed in a central portion of said first vessel, the innermost part of the baffle having the cut-away portion adjacent to a bottom plate of the first vessel.

3. A separator according to claim 2, wherein an outer coil of a bottom end of the baffle is apertured to allow a mixture flow between a part of the passage in the outer coil and a part of a passage in a next adjacent coil.

4. A separator according to claim 2, wherein the baffle is formed from a straight sheet with a sloped end portion which is coiled to form the baffle.

5. A separator according to claim 2, wherein the baffle is formed from a corrugated sheet with a sloped end portion which is coiled to form the baffle.

6. A separator according to claim 2, wherein the bottom of the first vessel is shaped as a funnel and a valve is provided at its outlet through which deposited sediment can be drained.

7. A separator according to claim 1, wherein the elongate unit is a second vessel of less height and less diameter than the first vessel with the baffle therein provided in a portion of the first vessel and extending a predetermined distance thereinto with a lower part of the first vessel below said baffle serving as a sump to hold the residual component of the mixture.

8. A separator according to claim 7, wherein the elongate unit is arranged to receive the mixture at an inlet end of a passage substantially centrally of the elongate unit and the mixture flows around the passage with the disposable component of the mixture being discharged therefrom at or adjacent to an upper end of the passage via a pipe through the first vessel, while the residual component of the mixture flows into the sump of the first vessel.

9. A separator according to claim 7, wherein the unit is arranged to receive a partially separated mixture, the mixture first having passed through the first vessel to perform an initial separation of the components, the disposable component of the mixture thereafter being discharged from the unit via piping through the first vessel.

10. A separator according to claim 7, wherein an outer coil of a bottom end of the baffle is apertured to allow a mixture flow between a part of the passage in the outer coil and a part of a passage in a next adjacent coil.

11. A separator according to claim 7, wherein the baffle is formed from a straight sheet with a sloped end portion which is coiled to form the baffle.

12. A separator according to claim 7, wherein the baffle is formed from a corrugated sheet with a sloped end portion which is coiled to form the baffle.

13. A separator according to claim 1, wherein the elongate unit is a second vessel with the baffle mounted therein, the second vessel being mounted above the first vessel, the inlet means passing through the baffle of the second vessel with the innermost end of the baffle having a greater part of its cut-away portion adjacent to a bottom level of the second vessel.

14. A separator according to claim 1, wherein the elongate unit is a second vessel with the baffle mounted therein, the second vessel being mounted above the first vessel, the inlet means passing through the second vessel to terminate below a bottom plate in the second vessel, an aperture being provided in said bottom plate at or adjacent to an inner end of the passage to allow flow from the first vessel into the inner end of the passage to be discharged adjacent to a top of the passage at or adjacent to an outer end of the passage.

15. A separator according to claim 1, wherein an outer coil of a bottom end of the baffle is apertured to allow a mixture flow between a part of the passage in the outer coil and a part of a passage in a next adjacent coil.

16. A separator according to claim 1, wherein the baffle is formed from a straight sheet with a sloped end portion which is coiled to form a baffle.

17. A separator according to claim 1, wherein the baffle is formed from a corrugated sheet with a sloped end portion which is coiled to form a baffle.

* * * * *